United States Patent
Carus et al.

(10) Patent No.: US 7,769,701 B2
(45) Date of Patent: Aug. 3, 2010

(54) SATELLITE CLASSIFIER ENSEMBLE

(75) Inventors: Alwin B. Carus, Waban, MA (US); Thomas J. DePlonty, Melrose, MA (US)

(73) Assignee: Information Extraction Systems, Inc, Waban, MA (US)

( * ) Notice: Subject to any disclaimer, the term of this patent is extended or adjusted under 35 U.S.C. 154(b) by 597 days.

(21) Appl. No.: 11/821,060

(22) Filed: Jun. 21, 2007

(65) Prior Publication Data

US 2008/0126273 A1 May 29, 2008

Related U.S. Application Data

(60) Provisional application No. 60/815,431, filed on Jun. 21, 2006.

(51) Int. Cl.
*G06F 15/18* (2006.01)
(52) U.S. Cl. .............................................. 706/12; 707/5
(58) Field of Classification Search .................. 706/12
See application file for complete search history.

(56) References Cited

U.S. PATENT DOCUMENTS

| | | | |
|---|---|---|---|
| 6,606,625 B1 | 8/2003 | Muslea et al. | |
| 6,714,941 B1 | 3/2004 | Lerman et al. | |
| 6,728,707 B1 | 4/2004 | Wakefield et al. | |
| 6,732,097 B1 | 5/2004 | Wakefield et al. | |
| 6,732,098 B1 | 5/2004 | Wakefield et al. | |
| 6,738,765 B1 | 5/2004 | Wakefield et al. | |
| 6,741,988 B1 | 5/2004 | Wakefield et al. | |
| 7,139,752 B2 | 12/2004 | Broder et al. | |
| 7,146,361 B2 | 12/2004 | Broder et al. | |
| 7,558,778 B2 * | 7/2009 | Carus et al. ..................... | 707/1 |
| 2004/0167870 A1 | 8/2004 | Wakefield et al. | |
| 2004/0167883 A1 | 8/2004 | Wakefield et al. | |
| 2004/0167884 A1 | 8/2004 | Wakefield et al. | |
| 2004/0167885 A1 | 8/2004 | Wakefield et al. | |
| 2004/0167886 A1 | 8/2004 | Wakefield et al. | |
| 2004/0167887 A1 | 8/2004 | Wakefield et al. | |
| 2004/0167907 A1 | 8/2004 | Wakefield et al. | |
| 2004/0167908 A1 | 8/2004 | Wakefield et al. | |
| 2004/0167909 A1 | 8/2004 | Wakefield et al. | |

(Continued)

OTHER PUBLICATIONS

Bennett, Learning to Tag Multilingual Texts Through Observation, pp. 109-116, 1999.

(Continued)

*Primary Examiner*—Michael B Holmes
(74) *Attorney, Agent, or Firm*—Anthony L. Meola

(57) ABSTRACT

We have discovered a system and method for improving the quality of information extraction applications consisting of an ensemble of per-user, adaptive, on-line machine-learning classifiers that adapt to document content and judgments of users by continuously incorporating feedback from information extraction results and corrections that users apply to these results. The satellite classifier ensemble uses only the immediately available features for classifier improvement and it is independent of the complex cascade of earlier decisions leading to the final information extraction result. The machine-learning classifiers may also provide explanations or justifications for classification decisions in the form of rules, other machine-learning classifiers may provide feedback in the form of supporting instances or patterns. Developers control the number and type of classifiers in the satellite classifier ensemble, the pre-deployment training of these classifiers, and the features monitored by the implemented satellite classifier ensemble.

15 Claims, 4 Drawing Sheets

U.S. PATENT DOCUMENTS

| | | | |
|---|---|---|---|
| 2004/0167910 | A1 | 8/2004 | Wakefield et al. |
| 2004/0167911 | A1 | 8/2004 | Wakefield et al. |
| 2004/0215634 | A1 | 10/2004 | Wakefield et al. |
| 2004/0243554 | A1 | 12/2004 | Broder et al. |
| 2004/0243556 | A1 | 12/2004 | Ferucci et al. |
| 2004/0243560 | A1 | 12/2004 | Broder et al. |
| 2005/0027664 | A1 | 2/2005 | Johnson et al. |
| 2005/0071217 | A1 | 3/2005 | Hoogs et al. |
| 2005/0108256 | A1 | 5/2005 | Wakefield et al. |
| 2005/0165789 | A1 | 7/2005 | Minton et al. |

OTHER PUBLICATIONS

Seeger, Learning with labeled and unlabeled data, Dec. 19, 2002, Institute for Adaptive and Neural Computation, University of Edinburgh, 5 Forrest Hill, Edinburgh.

Schonn, Less is More: Active Learning with Support VectorMachines, Just Research, 4616 Henry Street, Pittsburgh, PA.

McCarthy, Lexical Chains.

Morris, Lexical Cohesion Computed by Thesaural Relations as an Indicator of the Structure of Text, 1991 Association for Computational Linguistics, vol. 17, No. 1.

Pierce, Limitations of Co-Training for Natural Language Learning from Large Datasets, Proceedings of the 2001 Conference on Empirical Methods in Natural Language Processing.

Riloff, Little Words Can Make a Big Difference for Text Classification, Proceedings of the 18th Annual International ACM SIGIR Conference on Research and Development in Information Retrieval, pp. 130-136.

Yangarber, Machine Learning of Extraction Patterns from Unannotated Corpora; Position Statement, Computer Science Department New York University.

Brill. Man vs. Machine, A case study in base Noun Phase Learning, Department of Computer Science, The Johns Hopkins University.

Dempster, Maximum Likelihood from Incomplete Data via the EM Algorithm, Journal of the Royal Statistical Society. Series B (Methodological), vol. 39, No. 1. (1977), pp. 1-38.

Engleson, Minimizing Manual Annotation Cost in Supervised Training From Corpora, Department of Mathematics and Computer Science Bar-Ilan University 52900 Ramat Gan, Israel.

Day, Mixed Initiative Development of Language Processing Systems, 1999, Advanced Information Center, The MITRE Corporation, Bedford MA.

Shen, Multi-Criteria-based Active Learning for Named Entity Recognition, Universität des Saarlandes, Computational Linguistics Dept., 66041 Saarbrücken, Germany, dshen@coli.uni-sb.de.

Bonino, Ontology Driven Semantic Search, Dipartimento di Automatica ed Informatica Corso Duca degli Abruzzi, 10129 Torino Italy, 2004.

Becker, Optimising Selective Sampling for Bootstrapping Named Entity Recognition, Proceedings of the Workshop on Learning with MultipleViews, 22 nd ICML, Bonn, Germany, 2005.

Seung, Query by Committee, Racah Institute of Physics and Center for Neural Computation Hebrew University Jerusalem, Israel, 1992.

Crestani, Retrieving Documents by Constrained Spreading Activation on Automatically Constructed Hypertexts, Department of Computing Science University of Glasgow Glasgow G12 8QQ, Scotland, 1999.

Wolverton, Retrieving Semantically Distant Analogies with Knowledge-Directed Spreading Activation, Knowledge Systems Laboratory, Stanford University, Palo Alto, CA, 1997.

NGAI, Rule Writing or Annotation: Cost Efficient Resource Usage for Base Noun Phrase Chunking, Department of Computer Science, The Johns Hopkins University, Baltimore, MD 2000.

Hwa, Sample Selection for Statistical Grammar Induction, Division of Engineering and Applied Sciences, Harvard University, 2000.

Hwa, Sample Selection for Statistical Parsing, University of Pittsburgh, Computational Linguistics, 2002.

Preece, Retrieval, Oct. 1991.

Crestani, Searching the Web by Constrained Spreading Activation, Department of Computing Science University of Glasgow Glasgow G12 8QQ, Scotland, 2000.

Kozima, Segmenting Narrative Text into Coherent Scenes, Department of Computer Science, University of Electro Communications, Tokyo, Japan 1994.

Freund, Selective Sampling Using the Query by Committee Algorithm, Machine Learning 28, pp. 133-168, 1997.

Muslea, Selective Sampling With Redundant Views, 2000, American Association for Artificial Intelligence.

Medelyan, Semantically Enhanced Automatic Keyphrase Indexing, a PhD Full Research Proposal, Jul. 30, 2006.

Guha, Semantic Search,IBM Research, Almaden, Budapest, Hungary, 2003,.

Sibler, an Efficient Text Summarizer Using Lexical Chains, Computer and Information Sciences, University of Delaware.

Kozima, Similarity Between Words Computed by Spreading Activation on an English Dictionary, Department of Computer Science, University of Electro Communicatons, Tokyo, Japan.

Ngai, Text Classification from Labeled and Unlabeled Documents using EM, Machine Learning, pp. 1-34, Kluwer Academic Publishers, Boston, Manufactured in the Netherlands, Mar. 15, 1998.

Brunn, Text Summarization Using Lexical Chains, Department of Mathematics and Computer Science University of Lethbridge, 4401 University Drive, Lethbridge, Alberta, Canada.

Medelyan, Thesaurus Based Automatic Keyphrase Indexing, JCDL, Jun. 2006, Chapel Hill, North Carolina, USA.

Medelyan, Thesaurus-Based Index Term Extraction for Agricultural Documents, Department of Computer Science, The University of Waikato, Private Bag 3105, Hamilton, New Zealand.

Cao, Uncertainty Reduction in Collaborative Bootstrapping: Measure and Algorithm, Microsoft Research Asia 5F Sigma Center, No. 49 Zhichun Road, Haidian Beijing, China, 2000.

Yabney, Understanding the Yarowsky Algorithm, Association for Computational Linguistics 2004.

Yangarber, Unsupervised Discovery of Scenario-Level Patterns for Information Extraction, Courant Institute of Mathematical Sciences, New York University.

Yangarber, Unsupervised Learning of Generalized Names, in Proceedings of the 19th International Conference on Computational Linguistics (COLING 2002).

Collins, Unsupervised Models for Named Entity Classification Michael Collins and Yoram Singer, AT&T Labs-Research, 180 Park Avenue, Florham Park, NJ, 1999.

Yarosky, Unsupervised Word Sense Disambiguation Rivaling Supervised Methods, Department of Computer and Information Science, University of Pennsylvania.

Riloff, Using Learned Extraction Patterns for Text Classification, Connecticut Statistical and Symbolic Approaches to Learning Natural Language Processing, p. 275-289, 1996.

Barzilay, Using Lexical Chains for Text Summarization, Mathematics and Computer Science Department, Ben Gurron University, Israel, 1997.

Ng, Weakly Supervised Natural Language Learning Without Redundant Views, Department of Computer Science Cornell University, Ithaca, New York.

Crestani, WebSCSA: Web Search by Constrained Spreading Activation, Department of Computing Science University of Glasgow Glasgow G12 8QQ, Scotland, UK.

Tsatsaroni, Word Sense Disambiguation with Spreading Activation Networks Generated from Thesauri, PENED 2003 Programme of the EU and the Greek General Secretariat for Research and Technology.

Huang, Applying Associative Retrieval Techniques to Alleviate the Sparsity Problem in Collaborative Filtering, ACM Transactions on Information Systems, vol. 22, No. 1, Jan. 2004, pp. 116-142.

Sibler, Efficiently Computed Lexical Chains as an Intermediate Representation for Automatic Text Summarization, Association for Computational Linguistics, vol. 28, 2002.

Chen, An Algorithmic Approach to Concept Exploration in a Large Knowledge Network (Automatic Thesaurus Consultation): Symbolic Branch and Bound Search vs. Connectionist Hopfield Net Activation, Journal of the American Society for Information Science, vol. 46 No. 5, pp. 348-369, 1995.

Andrew McCallum, Queue—Information Extraction, University of Massachusetts, Amherst, USA, 2006.

Andrew McCallum, Queue—Information Extraction, ACM Queue, pp. 48-47, University of Massachusetts, Amherst, USA, Nov. 2005.

Karanikas, Knowledge Discovery in text and Test Mining Software, Centre for Research in Information Management, Department of Computation, MIST, Manchester, UK.

Soderland, Learning Information Extraction Rules for Semi-Strucutred and Free Text, Machine Learning, 1997, pp. 1-44, Kluwer Academic Publishers, Boston, USA.

Liere, Active Learning with Committees for Text Categorization, American Association for Artifical Intelleigence, 1997, Dept. of Computer Science, Oregon State University, USA.

Day, Mixed-Initiative Development of Lanuage Processing Systems, 1997 Advanced Information Systems Center, the MITRE Corporation, Bedford MA.

Bennett, Learning to Tag Multilingual Texts Through Observation, 1998, pp. 109-116, SRA International, Fairfax, Virginia, USA.

Lewis, Heterogensous Uncertainty Sampling for . . . Machine Learning: Proceedings of the Eleventh Int'l Conf., pp. 148-156, Morgan Kaufman Publishers, San Franciso, CA.

Freund, Selective Sampling Using the Query by Committee Algorithm, Machine Learning: 28, 133-168, 1997, Kluwer Academic Publishers, The Netherlands.

Cohn, Improving Generalization with Active Learning, Machine Leraning 15, pp. 201-221, 1992.

Shen, A Collaborative Ability Measurement for Co-Training, Institute for Infocomm. Technology, 2004.

Dr. Dieter Merkl, Activation on the Move: Adaptive Information Retrieval via Spreading Activation; Institut fur Softwaretechnik, 2003.

Jones, Active Learning for Information Extraction with Multiple View Feature Sets, School of Computer Science, Carnegie Mellon University.

Thompson, Active Learning for Natural Language Parsing and Information Extraction, Appears in Proceedings of the Sixteenth International Machine Learning Conference,pp. 406-414, Bled, Slovenia, Jun. 1999.

Tang, Active Learning for Statistical Natural Language Parsing, Spoken Language Systems Group MIT Laboratory for Computer Science Cambridge, Massachusetts, 2002.

Finn, Active Learning Selection Strategies for Information Extraction Smart Media Institute, Computer Science Department, University College Dublin, Ireland.

Liere, Active Learning with Committees for Text Categorization, American Association for Artificial Intelligence, 1997.

Rocha, A Hybrid Approach for Searching in the Semantic Web, Dept. of Informatics, PUC-Rio and Milestone—I.T. Rua Marquês de São Vicente 225 Prédio Gênesis, Sala 21b Rio de Janeiro, RJ 22453-900, Brasil, May 17, 2004.

Day, The Alembic Workbench Environment for Natural Language Engineering, A National Resource Working in the Public Interest, the MITRE Corporation, 1997.

Merkl, An Adaptive Information Retrieval System based on Associative Networks Copyright, Australian Computer Society, Inc. First Asia-Pacific Conference on Conceptual Modelling, 2004.

Chen, An Algorithmic Approach to Concept Exploration in a Large knowledge Network (Automatic Thesaurus Consultation): Journal of the American Society for Information Science. 46(5):348-369, 1995.

Nigram, Analyzing the Effectiveness and Applicability of Cotraining School of Computer Science Carnegie Mellon University Pittsburgh, PA 15213.

Riloff, An Empirical Approach to Conceptual Case Frame Acquisition, The Sixth Workshop on Very Large Corpora, 1998.

Riloff, An Empirical Study of Automated Dictionary Construction for Information Extraction in Three Domains, AI Journal, El Sevier Publishers, 1996.

Riloff, An Introduction to the Sundance and AutoSlog Systems, Nov. 8, 2004.

Crestani, Application of Spreading Activation Techniques in Information Retrieval, Dipartimento di Elettronica e Informatica, Universit'a di Padova, Padova, Italy.sa.tex; Dec. 19, 1995; 14:37; no v.

Huangacm, Applying Associative Retrieval Techniques to Alleviate the Sparsity Problem in Collaborative Filtering Transactions on Information Systems, vol. 22, No. 1, Jan. 2004, pp. 116-142.

Stevenson, A Semantic Approach to IE Pattern Induction, Proceedings of the 43rd Annual Meeting of the ACL, pp. 379-386, Jun. 2005. Association for Computational Linguistic.

Lewis, A Sequential Algorthim for Training Text Classifiers, SIGIR 94, pp. 3-12, 1994.

Yangarber, Automatic Acquisition of Domain Knowledge for Information Extraction, Proceedings of the 18th International Conference on Computational Linguistics, 2000.

Rhiloff, Automatically Constructing a Dictionary for Information Extraction Tasks, Proceedings of the Eleventh National Conference on Artificial Intelligence, 1993, AAAI Press / MIT Press, pp. 811-816.

Rhiloff, Automatically Generating Extraction Patterns from Untagged Text, Proceedings of the Thirteenth National Conference on Artificial Intelligence, 1996, pp. 1044-1049.

Reeve, BioChain: Lexical Chaining Methods for Biomedical Text Summarization, SAC'06, Apr. 23-27, 2006, Dijon, France.

Abney, Bootstrapping, AT&T Laboratories—Research 180 Park Avenue, Florham Park, NJ, USA, 2002.

Lin, Bootstrapped Learning of Semantic Classes from Positive and Negative Examples, Proceedings of the ICML-2003 Workshop on the Continuum from Labeled to Unlabeled Data, Washington DC, 2003.

Blum, Combining Labeled and Unlabeled Data with Co-Training, Proceedings of the Conference on Computational Learning Theory, 1998.

Dagan, Committee Based Sample Selection for Probabilistic Classifiers, Journal of AI Research, pp. 355-360, 1999.

Dagan, Committee Based Sampling for Probabilistic Classifiers.

Doran, Comparing Lexical Chain-based Summarisation Approaches Using an Extrinsic Evaluation, Eds., GWC 2004, Proceedings, pp. 112-117. Masaryk University, Brno, 2003.

Aleman-Meza, Context-Aware Semantic Association Ranking, Semantic Web and Databases Workshop Proceedings. Berlin, Sep. 2003.

Bean, Corpus Based Identification of Non-Anaphoric of Noun Phrases, Proceedings of the 37th Annual Meeting of the Association for Computational Linguistics (ACL-99) pp. 373-380.

Yangarber, Counter-Training in Discovery of Semantic Patterns, Proceedings of the 41st Annual Meeting of the Association for Computational Linguistics (ACL 2003).

Sibler, Efficiently Computed Lexical Chains As an Intermediate Representation for Automatic Text Summarization, Association for Computational Linguistics, 2002.

Sibler, An Efficient Text Summarizer Using Lexical Chains, 2000.

McCallum, Employing EM and Pool Based Active Learning for Text Classification.

Goldman, Enhancing Supervised Learning with Unlabeled Data, Department of Computer Science, Washington University.

Steedman, Example Selection for Bootstrapping Statistical Parsers, Main Papers, pp. 157-164 Proceedings of HLT-NAACL 2003.

Yangarber, Extraction Pattern Discovery through Corpus Analysis, Computer Science Department, New York University.

Kenter, Using GATE as an Annotation Tool, Jan. 28, 2005.

Tablan, GATE—An Application Developer's Guide, Department of Computer Science, University of Sheffield, UK, Jul. 19, 2004.

Cunningham, Developing Language Processing Components, Jul. 2007.

Lewis, Heterogeneous Uncertainty Sampling for Supervised Learning, Machine Learning: Proceedings of the Eleventh International Conference, Morgan Kaufmann Publishers, San Francisco, CA, pp. 148-156.

IBM, An Open Industrial Strength for Platform Unstructured Information Analysis and Search, 2005.

Cohn, Improving Generalization with Active Learning, Machine Learning, 1990.

Brinker, Incorporating Diversity in Active Learning with Support Vector Machines, Proceedings of the Twentieth International Conference on Machine Learning (ICML-2003), Washington DC, 2003.

Yangarber, Information Extraction from Epidemiological Reports, Department of Computer Science, University of Helsinki, Finland, 2004.

Shi, Intimate Learning: A Novel Approach for Combining Labelled and Unlabelled Data, School of Computing Science, Simon Fraser University, Canada.

Hachey, Investigating the Effects of Selective Sampling on the Annotation Task, School of Informatics University of Edinburgh Edinburgh, EH8 9LW, UK.

Riloff, Learning Dictionaries for Information Extraction by Multi-Level Bootstrapping, American Association for Artificial Intelligence, 1999.

Blum, Learning From Lablelled and UnLabelled Data Using Graphics Mincuts, Computer Science Department, Carnegie Mellon University, 2001.

* cited by examiner

SATELLITE CLASSIFIER ENSEMBLE

CROSS REFERENCE TO RELATED APPLICATIONS

The present application relates to and takes priority from U.S. provisional application Ser. No. 60/815,431, filed on Jun. 21, 2006 and entitled "AN APPARATUS, SYSTEM AND METHOD FOR DEVELOPING TOOLS TO PROCESS NATURAL LANGUAGE TEXT", and International Application serial no. PCT/US07/13237, filed on Jun. 5, 2007 and entitled "AN APPARATUS, SYSTEM AND METHOD FOR DEVELOPING TOOLS TO PROCESS NATURAL LANGUAGE TEXT", which applications are hereby incorporated by reference in their entireties.

The present application also relates to co-invented and co-owned U.S. non-provisional patent application Ser. No. 11/820,677, filed on Jun. 20, 2007 and entitled "SEMANTIC EXPLORATION AND DISCOVERY" which application is hereby incorporated by reference in its entirety.

BACKGROUND OF THE INVENTION

1. The Field of the Present Invention

The present invention relates generally to an apparatus, system and method for improving the quality of natural language processing applications. The invention consists of an ensemble of per-user, adaptive, on-line machine-learning classifiers that adapt to document content and judgments of users by continuously and automatically incorporating feedback from application results and corrections that users apply to these results.

2. General Background

Information extraction (IE) and text mining systems are natural language processing (NLP) systems to identify, normalize, and remove duplicate information elements found in documents. Information extraction systems are used to discover and organize the latent meaningful and fine-grained content elements of documents. These content elements include such entities as persons, places, times, objects, events, and relationships among them. For example, an information extraction task in finance and business might consist of processing business articles and press releases to identify and relate the names of companies, stock ticker symbols, and employees and officers, times, and events such as mergers and acquisitions. These information elements are suitable for storage and retrieval by database and information retrieval systems. In the finance and business example, these data might be used to alert investors, bankers, and brokers of significant business transactions.

Information extraction is related to but distinct from information retrieval (IR). Information retrieval is concerned with searching and retrieving documents or document passages that correspond to a user's query, usually supplied in natural language as a few terms or even a question. Document clustering and classification are related natural language processing (NLP) techniques that can provide other types of high-level document navigation aids to complement IR by organizing documents into meaningfully related groups and sub-groups based on content. Additional related NLP technologies are document summarization, which attempts to find the passages of one or more documents that characterize their content succinctly, and question answering, which attempts to find passages in documents or construct answers from documents that represent the answers to questions such as "When was Abraham Lincoln born?" or "Why is the sky blue?"

Information extraction plays a role in IR because it identifies and normalizes information in natural language documents and thereby makes this information searchable. It also brings information retrieval closer to fielded database search because the diversity of expression in text documents has been disciplined through normalization. In the mergers and acquisitions example, the names of companies, persons, products, times, and events would be represented in a uniform manner. This makes it significantly easier to identify business activities for a given company such as IBM even if the original texts had many different ways of mentioning the company (e.g., "IBM", "International Business Machines Corporation", "International Business Machines").

Information extraction systems have traditionally been developed by labor-intensive construction of hand-crafted rules; and more recently by applying machine-learning techniques on the basis of hand-annotated document sets. Both approaches have been expensive, time-consuming, demand significant discipline and quality control, and demand extensive domain knowledge and specialized expertise. Information extraction systems have consequently been hard and costly to develop, maintain, and customize for specific or different environments or needs. This has therefore limited the audience for information extraction systems.

There are numerous ways an information extraction system needs to be customized or adapted. For example, information extraction systems are typically customized to determine which document structures (such as headings, sections, lists, or tables) or genres (E-mails, letters, or reports) should be treated in a specific manner, or ignored. Solutions to this problem, in existing systems, are often fragile and difficult to generalize since they are written for a specific application, domain, site, user, genre, or document structure.

In addition, the linguistic components of information extraction systems (such as lexicons, word tokenization, morphology, and syntactic analysis must often be customized to deal with the unique language properties of documents in the proposed domains. It is sometimes claimed that generalized linguistic components produce good results irrespective of the domain or genre, but experience does not support this contention. For example, the kind of language found in medical documentation differs significantly from that found in news articles in vocabulary and syntax, among other things. Experience shows that linguistic components tuned to perform well in one of these domains tend are likely to be much less accurate in the other.

Furthermore, it also must be determined which domain- or site-specific information extraction elements and relationships such as persons, organizations, places, and other entities, times, events, and relationships among them should be extracted. Experience demonstrates that information extraction for a given entity developed for one domain often does not perform well in other domains. Different domains often demand completely different extraction targets. For instance, a biomedical application may be interested in biochemical and genetic information while a business application may be interested in stock prices.

Lastly, it is necessary to determine how the information extraction elements should be understood and related to each other in an ontology. An ontology not only organizes and disciplines the development process (what are the extraction categories, how are they defined, and how do they relate to each other), but also provides inferencing capabilities for applications that use the output of an information extraction system. For example, if "diabetes mellitus" is an "endocrine system disorder", it is possible to relate it to "acromegaly" and "hypothyroidism" and vice versa. Ontological relationships make it much easier to normalize, organize, and relate extracted entities; and consequently to search and navigate across them. Furthermore, rich medical ontologies such as SNOMED CT, possess inter-connections to many other types of medical knowledge and allow a user to relate "diabetes mellitus" to the "pancreas" (anatomical site) and "insulin," specifically in two ways, namely deficient production of the hormone results in diabetes and insulin injections are used to treat diabetes.

At present, developing, customizing, or adapting information extraction systems demands weeks or months of labor by highly skilled specialists. Substantially shorter times, less expertise, and significantly less effort are necessary for information extraction systems to find a wider audience.

Machine-learning classifiers and classifier ensembles have been used extensively in information extraction. They are highly successful techniques for identifying targets of interest for information extraction such as entities (persons, places, organizations), events, and times; and relationships among them.

It has become more and more common to use large unlabeled document collections and user feedback (for example, using "active learning") to train production classifiers either singly or in combination. However, the resulting classifiers are typically "frozen" or "static" after this initial development. Specifically these classifiers do not adapt or improve further from user feedback as the information extraction application generates results or the user modifies or corrects information extraction results.

Furthermore, it is difficult, even for experts, to discern what may be the source of the error in the complex cascade of prior decisions that produced the erroneous result. Further, even if the source of the error can be discerned, it is unlikely that users, as opposed to highly skilled experts, will be able to know how to modify the system or propose which classifier should be adapted with the user feedback.

Finally, users often want to understand how complex systems make decisions. Providing explanations for the results of information extraction applications that rely on a complex cascade of analyses is very difficult even for someone intimately knowledgeable about the workings of the given information extraction application.

3. Deficiencies of the Prior Art

Meta machine-learning methods such as classifier bagging, boosting, stacking, co-training, and combination have demonstrated improved prediction quality over the best stand-alone machine-learning algorithms. Other meta machine-learning techniques that involve user review and feedback such as active learning have been developed to reduce the time and cost of developing machine-learning applications. These techniques provide a repertoire of machine-learning techniques that not only have improved accuracy, but are also better adapted to the anticipated environment of use of the machine-learning application. However, these techniques have been applied only to developing a machine-learning application, but not to improving an already developed and deployed application. As a rule, natural language processing systems developed using machine-learning techniques are fixed and immutable. Once a natural language processing application is deployed, it is fixed until a new version is developed and deployed, even though the documents it is intended to process may be different or may change markedly over time; even though the user's vocabulary, syntax, and style may be substantially different from anything seen during development; even though the user's behavior on the given task may differ from what the development data would predict; and even though the task may change. When this happens, an application may perform very poorly. This can result in lowered productivity, reduced user satisfaction, and sometimes in the abandonment of the application entirely. At present, the sole recourse is to have the development staff identify a set of important problems experienced by the user and modify the system accordingly. Over time the number of users increase and the variability and complexity of document collections and user environments grow and these requests become correspondingly more frequent and difficult to manage. Furthermore, the problems also become more and more difficult and time-consuming to remedy since a repair to one user's problems may cause errors elsewhere for the same or other users.

The sole exception to this practice in natural language processing applications has been speech recognition. Single-user large-vocabulary speech recognition applications use acoustic and language model adaptation first when the user begins using a speech recognition system and then periodically as the user creates more and more dictated text. Adaptation is not done continuously because the underlying speech recognition statistical models do not adapt well with small increments of training data and the computational effort of updating acoustic models is high. Speech recognition systems do typically become better adapted to their users and have reduced error rates, but the adaptation process may happen only after a considerable amount of dictation has taken place. One consequence of this delay is that a user is forced to correct the same recognition errors repeatedly until sufficient data has been collected to train the speech recognition system not to make these errors.

Functionality that continuously tunes the application using information about the user's document collection, environment of use, and behavior is therefore needed.

SUMMARY OF THE INVENTION

We have discovered a system and method for improving the quality of information extraction applications consisting of an ensemble of per-user, adaptive, on-line machine-learning classifiers that adapt to document content and judgments of users by continuously incorporating feedback from information extraction results and corrections that users apply to these results.

The satellite classifier ensemble according to the present invention uses only the immediately available features for classifier improvement and it is independent of the complex cascade of earlier decisions leading to the final information extraction result. At least one of the machine-learning classifiers also provides explanations or justifications for classification decisions in the form of rules; other machine-learning classifiers may provide feedback in the form of supporting instances or patterns. Developers control the number and type of classifiers in the satellite classifier ensemble, the pre-deployment training of these classifiers, and the features monitored by the implemented satellite classifier ensemble.

The satellite classifier ensemble system according to the present invention provides an automatic system for recording how a given user works with a given application for a given task, feeding this information back to improve the quality of the underlying prediction system.

The satellite classifier ensemble according to the present invention solves the problems created by the prior art solves by providing a mechanism for incorporating success and failure of an information extraction application. The present invention advantageously implements an application with the ability to adapt more and more closely to the documents being processed and the expectations and behavior of the application's users.

The present invention further includes an on-line rule-induction algorithm in the satellite classifier ensemble where the information extraction application is able to provide explanations for why particular results, erroneous or not, occurred.

The satellite classifier ensemble according to the present invention advantageously learns from the successes and failures of the information extraction system at the very end of the complex cascade leading up to the extraction and the satellite classifier ensemble does not need to rely on adapting the behavior of earlier components. It adjusts the behavior of the information extraction application at the tail end of the information extraction process.

In first embodiment, the present invention includes a system for improving the quality of information extraction applications consisting of an ensemble of per-user, adaptive, on-line machine-learning classifiers that adapt to document content and judgments of plurality users by continuously incorporating feedback from information extraction results and corrections that the users apply to the results. The system according to this embodiment includes a development system and a run-time engine to support creation and deployment of satellite classifier ensembles, the deployment system and the run-time engine providing immediate adaptation to user feedback, at least one classifier-ensemble based annotator to build a parallel satellite classifier ensemble over training data, a set of baseline components for generating features from the training data and an input model employing at least one classifier algorithm, where the output of the satellite classifier ensemble is aggregated with the output of the ensemble it parallels to produce a final classification and annotation made on matching inputs.

In some embodiments the satellite classifier ensemble components are marked internally so that, when running an information extraction application, the run-time engine is able to identify components within the information extraction system, the components they parallel, and the output annotations the satellite and its partner produce.

In some embodiments an information extraction application implemented on behalf of a user, the run-time engine is passed a unique identifier corresponding to the user.

In some embodiments the information extraction systems is running a customized application on behalf of the user, and when the customized application includes satellite classifier ensemble components, the run-time engine including a user-specific copy of these satellite classifier ensemble components when the application is first run on behalf of that user.

In some embodiments the run-time engine uses the user-specific copy each time that the user runs the customized application.

In a second aspect the present invention includes a run-time engine in a first instance, comprising a conversion module, a set of data driven annotators, standard components, a set of ontologies, a tokenizer, linguistic processing components, structure recognition components, and developer created processing scripts. The invention also includes a development environment element having a development management system, a document management system, a development executive component, at least one annotation interface, a document structure system, an ontology management system, a development scripting language interpreter, where the development scripting language interpreter implements a first set of workflows, a semantic exploration and discovery component.

The invention also includes a feedback module with at least one client component in communication with the run-time engine in the first instance, where the run-time engine contains a per-user copy of a satellite classifier ensemble in communication with the client components, a log component for collecting user feedback for all applications in communication with the development environment and with the document management system.

In some embodiments the structure recognition components include document type and structure models and the run-time engine further includes a development created components module. In some embodiments the development executive component exists as a run-time engine in a second instance.

In a third aspect the present invention includes at least one satellite classifier ensemble based annotator, at least one developer specified classifier model in communication with the satellite classifier ensemble based annotator, a per-user copy of the satellite classifier ensemble in communication with the satellite classifier ensemble based annotator, and a training module in communication with the per-user copy of the satellite classifier ensemble.

In a fourth aspect the present invention includes a method for running a software application on a computer on behalf of a designated user, where the software application includes satellite classifier ensemble components and a run-time engine. The method includes creating a user-specific copy of satellite ensemble components and a run-time engine when the software application is first run on behalf of the user, using the user-specific copy thereafter, each time the user runs the software application, providing user feedback regarding the software application, dividing the feedback into correct predictions and incorrect predictions. With respect to the incorrect predictions the method also include identifying data the software application produced in error and the source of the error and dynamically retraining the satellite classifier ensemble and providing adaptation of the satellite classifier ensemble on the basis of the feedback.

In some embodiments the invention includes logging the user feedback, determining the context within which the incorrect predictions occurred and determining the context within which the correct predictions occurred.

In a fifth aspect, the present invention includes a feedback module, a document management module, a run-time engine operating in a first instance and a logging component, where the feedback module includes at least one client component, where the at least one client component is in communication with the run-time engine, the run-time engine having a per-user copy of a satellite classifier ensemble in communication with the client components and where the logging component collects user feedback for all applications in communication with the run-time engine and with the document management module.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE PREFERRED EMBODIMENTS

Figure 1:
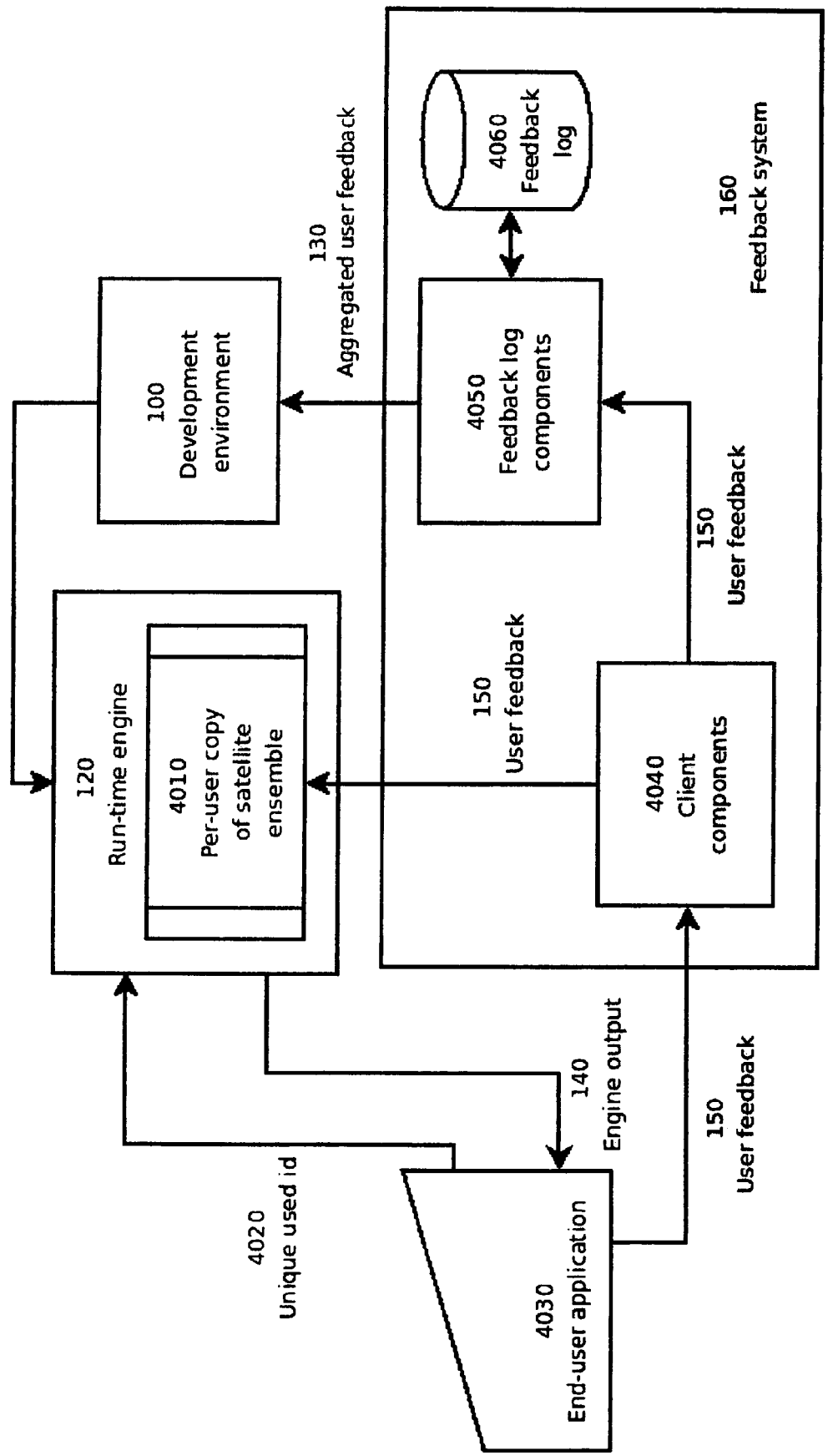
FIG. 1 shows high level logic flow of a feedback system operating with the a satellite classifier ensemble according to one embodiment of the invention.

The present disclosure will now be described more fully with reference to the Figures in which an embodiment of the present disclosure is shown. The subject matter of this disclosure may, however, be embodied in many different forms and should not be construed as being limited to the embodiments set forth herein.

The present invention is intended to be compatible with an information extraction system that includes a development system and a run-time engine to support creation and deployment of a satellite classifier ensemble. A unique and novel information extraction system is disclosed and claimed in International Application Serial No. PCT/US07/13237 filed Jun. 5, 2007 and entitled "AN APPARATUS, SYSTEM AND METHOD FOR DEVELOPING TOOLS TO PROCESS NATURAL LANGUAGE TEXT", which application has been incorporated by referenced in its entirety While the description below describes the present invention within the environment of this exemplary information extraction system, it is understood by those in the art that the present invention may be compatible with other information extraction systems as well.

Satellite classifier ensembles are components that provide immediate adaptation to user feedback. When developers create classifier-ensemble based annotators, at their option, the system will automatically build an additional, parallel satellite classifier ensemble over the same training data. A satellite classifier ensemble's classifiers will only use features from the training data generated by baseline engine components, that is, the features for satellite ensembles will not depend on a complex cascade of analysis. The model employed in some classifier algorithms (for example, neural networks) is represented in a way that makes it very difficult for a human to understand the relationship between an input instance and its output class. On the other hand, other algorithms (such as rule induction) employ representations where this can be much more readily understood, and the algorithm can be used not only to produce an output classification for some input instance, but also an explanation or justification for the output classification in terms of the input features. Satellite classifier ensembles may also include one or more classifiers with the latter property.

The output of a satellite classifier ensemble is aggregated with the output of the ensemble it parallels to produce the final classification and annotation made on matching inputs, whereas the run-time engine supports certain special functionality for satellite ensembles. Satellite classifier ensemble components are marked internally so that, when running an information extraction application that includes such components, the run-time engine will be able to identify them, the components they parallel, and the output annotations the satellite and its partner produce.

When running any information extraction application on behalf of a given user, the run-time engine can be passed a unique identifier corresponding to the user. Given a unique user ID: when running an application on behalf of a designated user, if the application includes satellite classifier ensemble components, the run-time engine automatically creates a user-specific copy of these components when the application is first run on behalf of that user. The application uses this user-specific copy thereafter, each time that user runs the same application.

If the user provides feedback to the output of such an information extraction application, identifying data the application missed, or identified wholly or partially in error, and if some satellite classifier ensemble is partially responsible for the classification that led to the error, then the ensemble is dynamically retrained, providing immediate adaptation to the feedback. A feedback system overall is likely divided into two major subsystems. First there are likely [What is the intention of this term. You seem to want to develop the idea of related but independent client applications here, but this idea really isn't followed up on using this terminology] client components that collect user feedback on the output of an information extraction application, and communicate these to the run-time engine hosting the application. Second a feedback log component exists to record all feedback on the output of an application as given by all its users.

The client components typically both communicate user feedback to the engine, in support of immediate adaptation using satellite classifier ensembles and transmit this feedback to the feedback log component to be recorded permanently.

Using the feedback log, a developer can recreate the state of a user-specific satellite classifier component at any given time, for diagnostic purposes. Developers can also use the feedback log to aggregate all of the feedback related to a particular component of a given application. The log provides tools that allow the feedback to be transformed easily into new training instances, which can be used, for example, to retrain the components, for deployment in a later, improved version of the application.

Referring now to FIG. 1 there is shown an aggregated feedback system 130 interacting with a development environment 100 and run-time engine 120 of an information extraction system to support creation and deployment of satellite classifier ensembles 4010. These are the components that will provide immediate adaptation to user feedback.

When developers create applications in the development environment 100 those applications may include classifier-based annotators. When this is the case, at the developer's option, the development system automatically builds an additional, parallel satellite classifier ensemble, over the same training data, to be included as an element of the application.

The classifiers according to the present invention may differ from the developer-specified ensemble in certain ways such as the features employed in building the classifier models, the algorithms and parameters used.

The model employed in some classifier algorithms (for example, neural networks) is represented in a way that makes it very difficult for a human to understand the relationship between an input example and its output class. On the other hand, other algorithms (such as rule induction) employ representations where this can be much more readily understood, and the algorithm can be used not only to produce an output classification for some input instance, but also an explanation or justification for the output classification in terms of the input features. Satellite classifier ensembles may include one or more classifiers with the latter property.

The output of a satellite classifier ensemble is aggregated with the output of the ensemble it parallels to produce the final classification and annotation made on matching inputs.

When an application is deployed and running on the run-time engine 120 it invokes certain special functionality when the application includes satellite ensembles.

Satellite classifier ensembles are distinguished internally so that, when running an IE application that includes such components, the run-time engine is able to identify them, the components they operate in parallel to, and the output annotations these produce.

When running any IE application on behalf of a given user, the run-time engine will be passed a unique identifier corresponding to the user 4020. Given a unique user ID 4020 when running an application on behalf of a designated user, if the application includes satellite classifier ensemble components, the run-time engine may create a user-specific copy of these components when the application is first run on behalf of that user 4010 and may use the user-specific copy thereafter, each time that user runs the same application.

If the user's application 4030 provides feedback 150 to the output 140 of such an IE application identifying data the application missed, or identified wholly or partially in error, and if some satellite classifier ensemble is partially responsible for the classification that led to the error, then the ensemble is dynamically retrained, providing immediate adaptation to the feedback 150, specifically the 4040 client components to the per-user copy of satellite classifier ensemble 4010.

Figure 2:
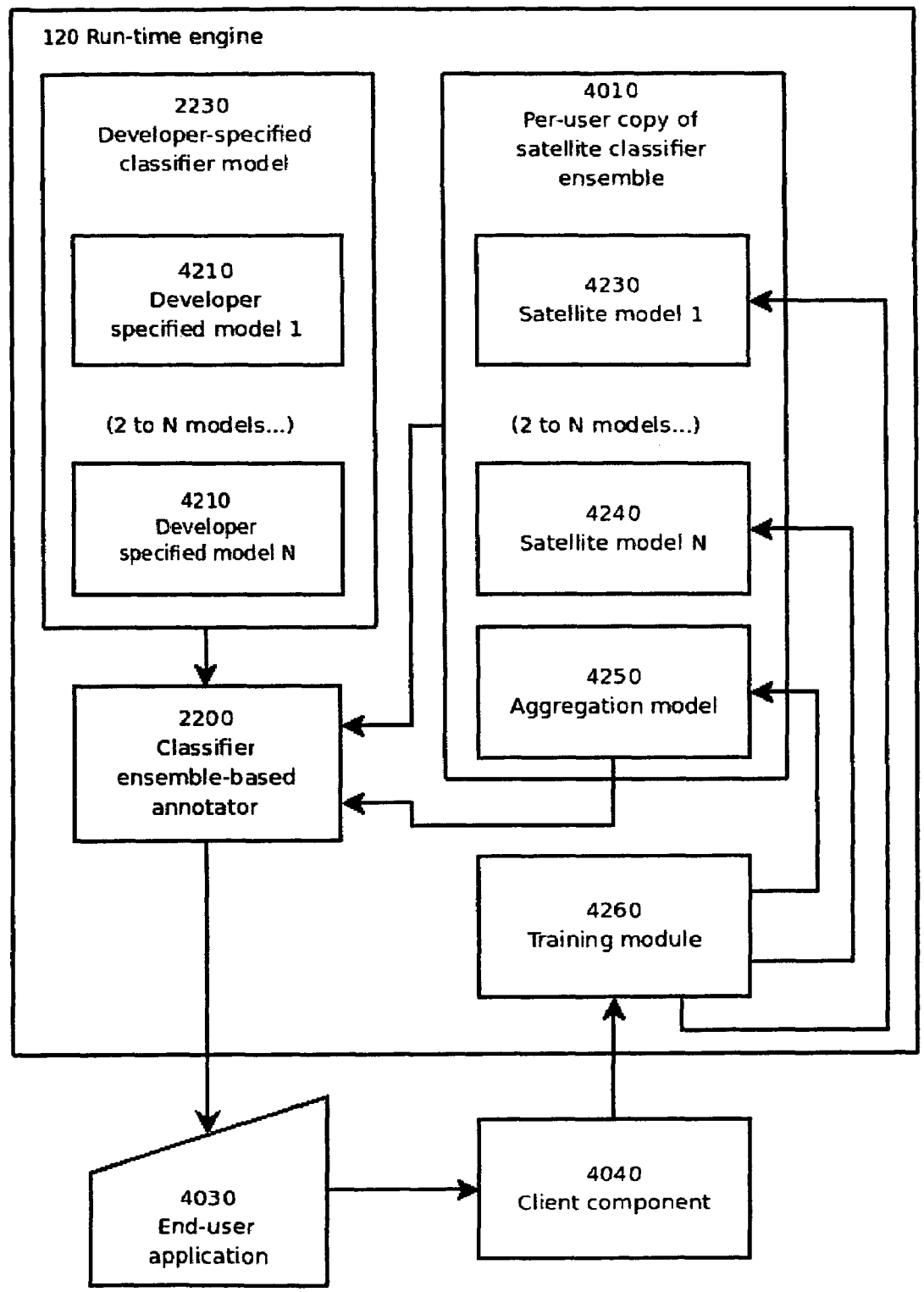
FIG. 2 shows a more detailed view of the satellite classifier ensemble in the run-time engine of FIG. 1 according to one embodiment of the invention.

Referring now to FIG. 2, there is shown functions of a satellite classifier ensemble in the run-time engine according to one embodiment of the present invention in more detail. For those modules that consist of a developer-created classifier 2230 paired with a satellite classifier ensemble 4010, the classifier ensemble-based matcher 2200 combines input from both to determine the classification of an unknown input.

The developer-specified model may contain two or more classifiers, where the satellite classifier ensemble consists, internally, of two or more classifiers 4210, 4220, 4230 and 4240. In addition, the satellite classifier ensemble contains an aggregation model 4250 which is used to compute how the output of the various individual classifiers in the developer-specified classifiers and satellite classifier ensembles are combined to produce the final output.

When an end-user application 4030 sends feedback to the client component 4040, this feedback is sent to the engine, where it is processed by a training module 4260. The training model adjusts the individual classifier modules in the satellite classifier ensemble, and the aggregation model, in response to the given feedback.

The satellite classifier ensemble according to the present invention advantageously provides a mechanism for incorporating feedback on the success and failure of an IE application. This gives the IE application the ability to adapt more and more closely to the documents being processed and the expectations and behavior of the application's users. Additionally, by including an on-line rule-induction algorithm in the classifier ensemble, the IE application is able to provide explanations for why particular results, erroneous or not, happened. Finally, because the satellite classifier ensemble accomplishes learning from the successes and failures of the IE application itself at the very end of the complex cascade leading up to the extraction, it does not have to rely on adapting the specific behaviors of earlier components. The system adjusts the behavior of the IE application at the very end of the information extraction process.

The feedback system 160 overall is divided into two major components including the client component 4040 and the feedback log component 4050. The client component collects user feedback on the output of an IE application, and communicates this to the run-time engine hosting the application. The feedback log component 4050 records all feedback on the output of an application as given by all its users.

The client component 4040 communicates user feedback both to the engine in support of immediate adaptation using satellite classifier ensembles, and to the feedback log component to be recorded permanently. The feedback log component 4050 records all feedback for applications over time. Using the feedback log, a developer can recreate the state of a user-specific satellite classifier component at any given time, for example, for diagnostic purposes.

Developers can also use the feedback log to aggregate all of the feedback related to retrain or redevelop a particular component of a given application 130. The log provides tools that allow the feedback to be transformed easily into new training instances, which can be used, for example, to retrain the components, for deployment in a later, improved version of the application 4000. The feedback log component 4050 records all feedback for applications over time. Using the feedback log 4060, a developer can recreate the state of a user-specific satellite classifier component at any given time, for diagnostic purposes. Developers can also use the feedback log to aggregate all of the feedback 130 related to a particular component of a given application.

Figure 3:
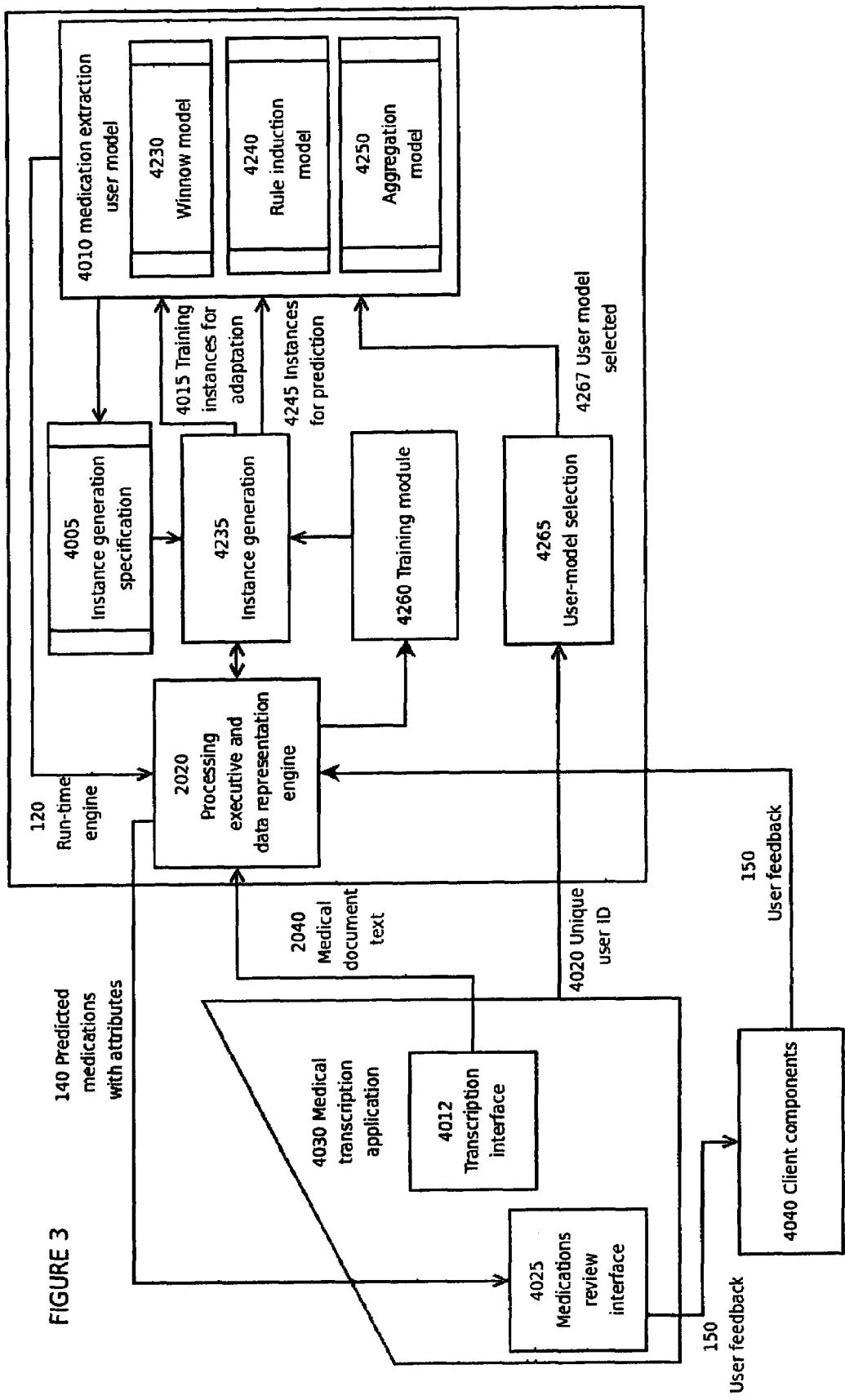
FIG. 3 shows components and flow of control of a satellite classifier ensemble being used to improve a medications extraction application through user feedback from a medical transcription system according to one embodiment of the present invention.

Referring now to FIG. 3 there is shown the components and flow of control of a satellite classifier ensemble being used to improve a medications extraction application through user feedback from a medical transcription system. The user in this case is a medical transcriptionist that creates medical reports by listening to and transcribing dictated medical reports that contain additional medical information provided by the physician or nurse such as the prescribed medications and their associated attributes (for example, prescribed dosage, quantity, and frequency; instructions; and number of refills). The medications extraction application identifies the medications and their associated attributes in the transcribed documents.

During the development process the developer creates an instance generation specification 4005 and generates the production user model for medication extractions consisting of Winnow 4230, rule induction 4240, and aggregation 4250 models. The aggregation model combines the results of the Winnow and rule induction models. The Winnow, rule induction, and aggregation models will be adapted through the user feedback that the transcriptionist generates using the medications review interface 4025. The medication extraction user model 4010 and the instance generation specification are incorporated into the run-time engine 120.

Whenever either a document or user feedback is submitted to the run-time engine 120, the medication transcription client also submits a user identifier to uniquely identify which user is submitting documents or providing user feedback after reviewing generated medications. A user model selection module 4265 loads the selected medication extraction user model 4265 specific to the given user. In the case of medical transcription applications, the user may be the transcriptionist, the medical provider who dictated the medical report or a combination of the two. A medical document text 2040 is submitted by a medical transcription application 4030 using its transcription interface 4012 to the run-time engine 120. This document is processed by the processing executive and representation engine 2020. The representation engine then passes a modified form of the original medical document text 2040 for prediction of medications. Instances for prediction 4245 are generated from this form of the text. The resulting instances for prediction 4245 are then passed for processing by the medication extraction user model 4010. The results of this prediction process are passed to the processing executive and representation engine 2020 which in turn passes the predicted medications and their attributes 140 to the medications review interface 4025.

The transcriptionist reviews the generated predictions for accuracy in the context of the original document in the medications review interface 4025. If a medication prediction is correct, the transcriptionist leaves it unchanged. If it is incorrect, the transcriptionist edits the name or attributes of the medication. If a medication is missing, the transcriptionist "swipes" a text span for the missing medication and provides the name and attributes of the missing medication (or alternatively submits the text to the run-time engine for prediction and reviews the output of the prediction process). The resulting user feedback 150 is passed to the client components 4040 which submits the user feedback to the processing executive and representation module 2020 of the run-time engine 120. User feedback involving a category change or a "swiped" span of text is handled identically, namely the text associated with the given instance is passed to the training module 4260 which in turns performs instance generation 4235 using the instance generation specification 4005. The training instances for adaptation 4015 are then added to the training pool of the medication extraction user model 4010. The instances for prediction 4245 may be submitted singly or in batch. The updated pool of training instances of the medication extraction user model 4010 is then used to adapt the Winnow 4230, rule induction 4240, and the aggregation 4250 models. The adaptation process is different for the Winnow and rule induction models. In the Winnow model, each new instance is submitted to the Winnow learning module which re-trains its model incrementally. In the rule induction model, the entire updated pool of training instances is submitted to the rule induction training module to recompute an adapted rule induction model. The adapted models now become the active processing models and are used for medication extraction processing by the processing executive and representation engine 2020.

Figure 4:
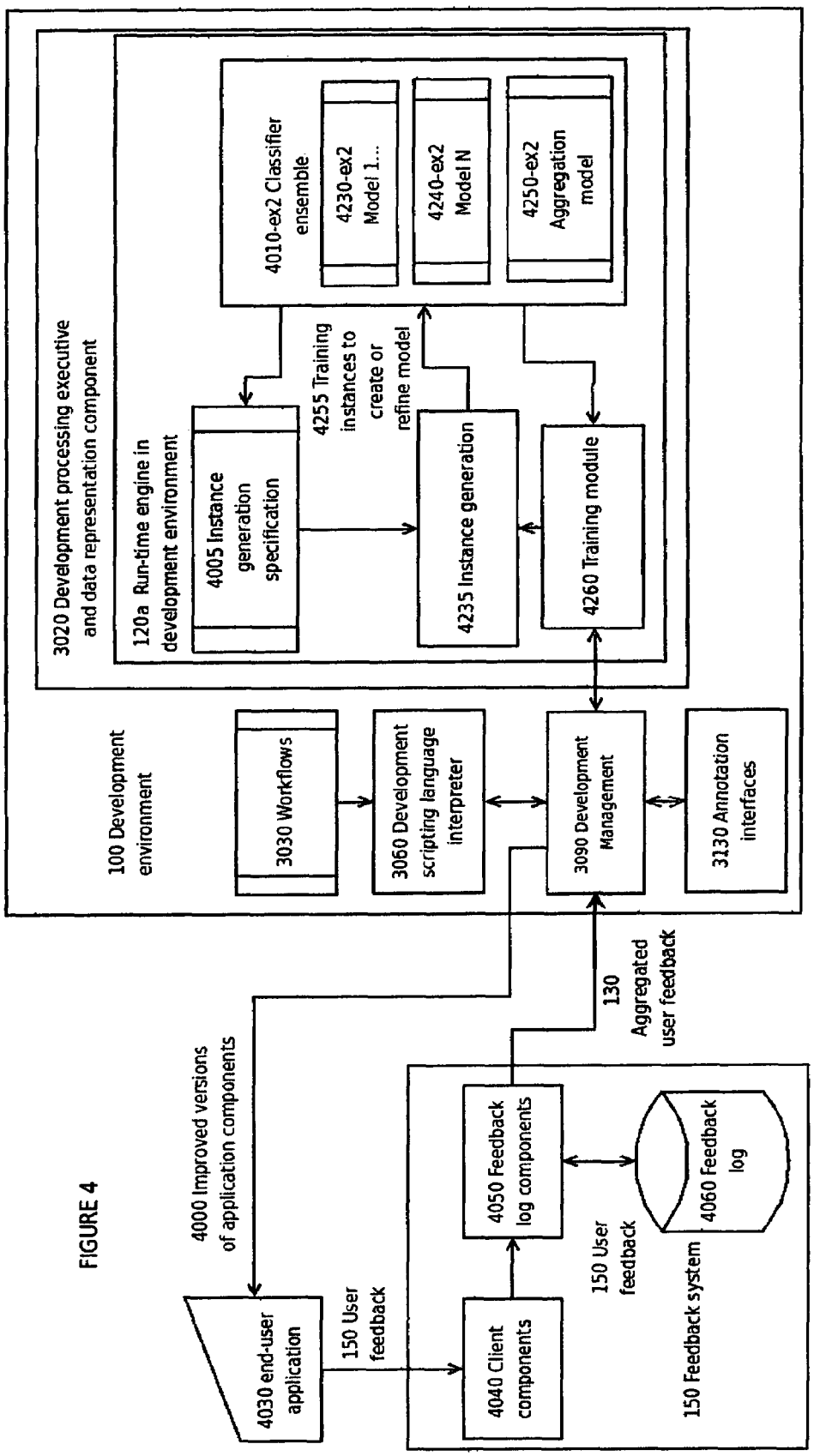
FIG. 4 shows components and flow of control of a satellite classifier ensemble using aggregated user feedback to improve application components according to one embodiment of the present invention.

Referring now to FIG. 4 there is shown the components and flow of control of a satellite classifier ensemble using aggregated user feedback to improve application components.

An end-user application 4030 processes documents and a user generates user feedback 150 by reviewing the generated predictions. The user feedback 150 is submitted to a feedback system via client components 4040 which pass it to feedback log components 4050 which in turn store the user feedback in a feedback log 4060. When feedback has been collected, the aggregated user feedback 130 can be collected by the feedback log components 4050 from the feedback log 4060 and submitted to the development environment 100. The aggregated user feedback 130 is submitted to the development management module 3090. The development management module 2090 processes feedback using workflows 3030 that are executed by the development scripting language interpreter 3060 using information about the relevant annotations supplied by the annotation interfaces 3130.

The aggregated user feedback 130 is then submitted for processing by the training module 4260 of the development processing executive and data representation component 3020. The training module 4260 passes the user feedback for instance generation 4235 using the instance generation specification 4005. The generated instances 4235 and their associated classes are then submitted to the satellite classifier ensemble 4010 for creating or adapting one or more classifier models. The created or adapted models use the instances from aggregated user feedback, and the instances used to develop the original models, at the developer's discretion. The new models now become the production models in the satellite classifier ensemble 4010. The satellite classifier ensemble 4010 is available for use in the development environment 100 and is also passed through the development management module 3090 as an improved version of application components 4000 where they can be used for processing by the deployed application.

It will be apparent to one of skill in the art that described herein is a novel an apparatus, system and method for improving the quality of natural language processing applications. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A system for improving the quality of information extraction applications consisting of an ensemble of per-user, adaptive, on-line machine-learning classifiers that adapt to document content and judgments of plurality users by continuously incorporating feedback from information extraction results and corrections that the users apply to the results, the system comprising the following components:

a development system and a run-time engine to support creation and deployment of satellite classifier ensembles, the deployment system and the run-time engine providing immediate adaptation to user feedback;

at least one classifier-ensemble based annotator to build a parallel satellite classifier ensemble over training data;

a set of baseline components for generating features from the training data; and an input model employing at least one classifier algorithm, where the output of the satellite classifier ensemble is aggregated with the output of the ensemble it parallels to produce a final classification and annotation made on matching inputs.

2. The system according to claim 1 where the satellite classifier ensemble components are marked internally so that, when running an information extraction application, the run-time engine is able to identify components within said information extraction system, the components they parallel, and the output annotations the satellite and its partner produce.

3. The system according to claim 2 where an information extraction application implemented on behalf of a user, the run-time engine is passed a unique identifier corresponding to the user.

4. The system according to claim 3, when the information extraction systems is running a customized application on behalf of the user, and when the customized application includes satellite classifier ensemble components, the run-time engine including a user-specific copy of these satellite classifier ensemble components when the application is first run on behalf of that user.

5. The system according to claim 4 where the run-time engine uses the user-specific copy each time that the user runs the customized application.

6. A system for improving the quality of information extraction applications consisting of an ensemble of per-user, adaptive, on-line machine-learning classifiers that adapt to document content and judgments of a plurality users by continuously incorporating feedback from information extraction results and corrections that the users apply to the results, the system comprising:

a run-time engine in a first instance, comprising a conversion module, a set of data driven annotators, standard components, a set of ontologies, a tokenizer, linguistic processing components, structure recognition components, and developer created processing scripts;

a development environment element having a development management system, a document management system, a development executive component, at least one annotation interface, a document structure system, an ontology management system, a development scripting language interpreter, where the development scripting language interpreter implements a first set of workflows, a semantic exploration and discovery component; and a feedback module with at least one client component in communication with the run-time engine in the first instance, where the run-time engine contains a per-user copy of a satellite classifier ensemble in communication with the client components, a log component for collecting user feedback for all applications in communication with the development environment and with the document management system.

7. The system according to claim 6 where the structure recognition components include document type and structure models.

8. The system according to claim 6 where the run-time engine further includes a development created components module.

9. The system according to claim 6 where the development executive component exists as a run-time engine in a second instance.

10. A system for improving the quality of information extraction applications consisting of an ensemble of per-user, adaptive, on-line machine-learning classifiers that adapt to document content and judgments of a plurality of users by continuously incorporating feedback from information extraction results and corrections that the users apply to the results, the system comprising:

at least one satellite classifier ensemble based annotator;

at least one developer specified classifier model in communication with the satellite classifier ensemble based annotator;

a per-user copy of the satellite classifier ensemble in communication with the satellite classifier ensemble based annotator; and a training module in communication with the per-user copy of the satellite classifier ensemble.

11. A method for running a software application on a computer on behalf of a designated user, the software application including satellite classifier ensemble components and a run-time engine, the method comprising the steps of:

creating a user-specific copy of satellite ensemble components and a run-time engine when the software application is first run on behalf of the user;

using the user-specific copy thereafter, each time the user runs the software application;

providing user feedback regarding the software application;

dividing the feedback into correct predictions and incorrect predictions;

with respect to the incorrect predictions, identifying data the software application produced in error and the source of the error; and dynamically retraining the satellite classifier ensemble and providing adaptation of the satellite classifier ensemble on the basis of the feedback.

12. The method according to claim 11 further comprising the step of logging the user feedback.

13. The method according to claim 12 further comprising the step of determining the context within which the incorrect predictions occurred.

14. The method according to claim 12 further comprising the step of determining the context within which the correct predictions occurred.

15. A system for improving the quality of information extraction applications consisting of an ensemble of per-user, adaptive, on-line machine-learning classifiers that adapt to document content and judgments of a plurality of users by continuously incorporating feedback from information extraction results and corrections that the users apply to the results, the system comprising a feedback module, a document management module, a run-time engine operating in a first instance and a logging component, where the feedback module includes at least one client component, where the at least one client component is in communication with the run-time engine, the run-time engine having a per-user copy of a satellite classifier ensemble in communication with the client components and where the logging component collects user feedback for all applications in communication with the run-time engine and with the document management module.

* * * * *